United States Patent [19]

Cain

[11] Patent Number: 5,758,682
[45] Date of Patent: Jun. 2, 1998

[54] SAFETY SHUT OFF VALVE

[75] Inventor: Jimmy D. Cain, Bartlesville, Okla.

[73] Assignee: Metal Goods Manufacturing Company, Bartlesville, Okla.

[21] Appl. No.: 658,658

[22] Filed: Jun. 5, 1996

[51] Int. Cl.[6] ............................................ F16K 17/40
[52] U.S. Cl. .................. 137/68.14; 137/71; 137/543.13; 251/360
[58] Field of Search ......................... 137/68.14, 71, 137/543.13

[56] References Cited

U.S. PATENT DOCUMENTS

| | | | |
|---|---|---|---|
| 2,048,388 | 7/1936 | Johnsen | 137/162 |
| 2,563,244 | 8/1951 | Aoliser | 137/71 X |
| 2,804,317 | 8/1957 | Prater | 137/68.14 |
| 2,906,280 | 9/1959 | Mount | 137/68.14 |
| 2,910,080 | 10/1959 | Wright et al. | 137/68.14 X |
| 3,542,047 | 11/1970 | Nelson | 137/68 |
| 3,630,214 | 12/1971 | Levering | 137/68 |
| 3,719,194 | 3/1973 | Anderson et al. | 137/68 |
| 3,741,521 | 6/1973 | Tatsuno | 251/149.7 |
| 3,995,694 | 12/1976 | Freiburger | 137/4 |
| 4,064,889 | 12/1977 | Gayle et al. | 137/68 R |
| 4,064,907 | 12/1977 | Billington et al. | 137/614.2 |
| 4,090,524 | 5/1978 | Allread et al. | 137/68 R |
| 4,108,204 | 8/1978 | Day | 137/543.13 |
| 4,230,161 | 10/1980 | Billington et al. | 141/302 |
| 4,328,822 | 5/1982 | Wilhelm | 137/68 R |
| 4,351,351 | 9/1982 | Flory et al. | 137/68 R |
| 4,359,066 | 11/1982 | Hunt | 137/614.06 |
| 4,361,165 | 11/1982 | Flory | 137/69 |
| 4,368,756 | 1/1983 | Carlson | 137/543.13 X |
| 4,392,513 | 7/1983 | Parrish | 137/614.01 |
| 4,562,962 | 1/1986 | Hartman | 239/200 |
| 4,614,201 | 9/1986 | King et al. | 137/68.1 |
| 4,625,746 | 12/1986 | Calvin et al. | 137/68.1 |
| 4,762,140 | 8/1988 | Davis | 137/71 |
| 4,763,683 | 8/1988 | Carmack | 137/68.1 |
| 4,827,977 | 5/1989 | Fink, Jr. | 137/614.04 |
| 4,842,198 | 6/1989 | Chang | 239/200 |
| 4,848,661 | 7/1989 | Palmer et al. | 239/204 |
| 4,852,602 | 8/1989 | McKinnon | 137/68.1 |
| 4,899,792 | 2/1990 | Podgers | 141/382 |
| 4,921,000 | 5/1990 | King et al. | 137/68.1 |
| 5,186,202 | 2/1993 | Meisenheimer, Jr. | 137/68.1 |
| 5,289,842 | 3/1994 | Bravo | 137/68.1 |
| 5,305,776 | 4/1994 | Romano | 137/68.1 |
| 5,351,708 | 10/1994 | Donato et al. | 137/68.1 |
| 5,372,306 | 12/1994 | Yianilos | 239/201 |

*Primary Examiner*—John Rivell
*Attorney, Agent, or Firm*—Head, Johnson & Kachigian

[57] ABSTRACT

A safety shut off valve has a tubular body with an axial guide therein. A poppet is secured to a shaft slidably supported by the axial guide. A tubular seat received within the tubular body has a seating surface against which the poppet seats when in the closed position. The body including a stop member that engages a plunger portion extending from the poppet to hold the poppet open. The body having a circumferential area of weakness therearound so that if the body is severed along the area of weakness, the stop member is removed and the poppet is allowed to close to prevent fluid flow through the body.

8 Claims, 2 Drawing Sheets

SAFETY SHUT OFF VALVE

REFERENCE TO PENDING APPLICATIONS

This application is not related to any pending applications.

REFERENCE TO MICROFICHE APPENDIX

This application is not referenced in any microfiche appendix.

BACKGROUND OF THE INVENTION

The present invention relates to a safety shut off valve (sometimes referred to as a "break-away coupling") for use in a piping system or for connecting a hose to any apparatus by which fluid or gas is dispensed to provide shut off of fluid flow if a frangible portion of the valve breaks away.

The safety valve of this invention is particularly useful for conveying liquids or gases that are either flammable or hazardous. The safety shut off valve is normally open but blocks the flow of fluids therethrough in response to the breakaway of a portion of the valve. This is achieved by providing an area of weakness or a frangible area so that any force that would tend to rupture a dispensing hose attached to the valve will first cause the valve itself to sever along an area of weakness. When a portion of the valve is severed along the area of weakness, a poppet closes and thereby prevents further flow through the valve.

Others have provided safety valves having essentially the same intent of the present invention and for background reference to safety valves of the type to be illustrated and described, reference may be had to the following United States patents:

| U.S. Pat. No. | INVENTOR | TITLE |
|---|---|---|
| 2,048,388 | Johnsen | Safety Device |
| 3,542,047 | Nelson | Temperature and Impact Responsive Shut-Off Valve |
| 3,630,214 | Levering | Frangible Coupling |
| 3,719,194 | Anderson et al | Breakaway Coupling |
| 3,741,521 | Tatsuno | Pipe Coupling With Safety Valve |
| 4,064,907 | Billington et al | Fill Limiting Filler Valve Unit |
| 4,064,889 | Gayle et al | Break-Away Safety Valve |
| 4,090,524 | Allread et al | Frangible Valved Fitting |
| 4,090,524 | Allread et al | Frangible Valved Fitting |
| 4,230,161 | Billington et al | Thermal Manual Emergency Shut Off Valve |
| 4,328,822 | Wilhelm | Breakaway Coupling Assembly |
| 4,351,351 | Flory et al | Breakaway Pipe Coupling With Automatically Closed Valves |
| 4,359,066 | Hunt | Pipe Coupling |
| 4,361,165 | Flory | Breakaway Pipe Coupling With Automatically Closed Valves |
| 4,392,513 | Parrish | Quick Disconnect Safety Coupling |
| 4,562,962 | Hartman | Sprinkling System and Valve Therefor |
| 4,614,201 | King et al | Break-Away Coupling For Hoselines |
| 4,625,746 | Calvin et al | Automatic Fluid Sealing Mechanism For A Conduit With A Frangible Connector |
| 4,762,140 | Davis | Snap-Off Plug Valve |
| 4,763,683 | Carmack | Breakaway Coupling For A Coaxial Fuel Supply Hose |
| 4,827,977 | Fink, Jr. | Breakaway Hose Coupling |
| 4,842,198 | Chang | Device For Damage Protection Against Local Flooding Caused By Sprinkler Failure |
| 4,848,661 | Palmer et al | Sprinkler Head Shutoff Valve |
| 4,852,602 | McKinnon | Riser Check Valve |
| 4,899,792 | Podgers | Fueling Nozzle Providing Combination Breakaway and Swivel Coupling |
| 4,921,000 | King et al | Break-Away Coupling For Hoselines |
| 5,186,202 | Meisenheimer, Jr. | Trigger Means For Self-Closing Breakaway Valve Assemblies |
| 5,289,842 | Bravo | Vibration-Resistant Impact Valve For Vapor Recovery Line |
| 5,305,776 | Romano | Emergency Shut-Off Device |
| 5,351,708 | Donato et al | Automatic Fluid Sealing Mechanism For A Conduit With A Frangible Connector |
| 5,372,306 | Yianilos | Fail Safe Lawn Sprinkler Device |

BRIEF SUMMARY OF THE INVENTION

A safety shut off valve has a tubular body. While the tubular body may be a single piece, in the preferred arrangement the tubular body is formed of first and second tubular bodies. An axial guide is secured within the first body portion. A poppet is supported by the axial guide. The poppet has a cylindrical shaft and an enlarged external diameter flange portion having a circumferential seating surface thereon. The shaft is slidably supported by the axial guide within the tubular first body. The poppet is moveable between a valve open and a valve closed position.

The poppet has a plunger portion extending from the flange portion in the direction opposite of and coaxial with the cylindrical shaft.

A tubular seat is supported within the tubular body adjacent the second end thereof, the seat having a circumferential seating surface that is contacted by the poppet seating surface when the poppet is in closed position.

A tubular second body is threadably attached to the first body second end so that, when attached, the first and second bodies are held in coaxial relationship with each other. The second body has, intermediate its opposed ends, a circumferential break point of reduced structural strength.

A stop member is mounted within the second body against which the plunger that extends from the poppet is engaged. The stop member serves to hold the poppet in an open position.

A compression spring is positioned within the first body and extends between the guide and the poppet flange portion, the compression spring serving to urge the poppet towards the closed position.

As long as the second tubular body is intact, the stop member engages the plunger extending from the poppet and the poppet is held in the open position against the compression of the spring. In the event that undue stress is applied to the outer end of the second body portion, which may be occasioned by stress applied to a hose or piping secured to the outer end of the second body portion, the second body portion severs along the line of weakness. When the outer portion of the second body severs, the stop member is removed, thereby permitting the poppet to be axially advanced by the force of the compression spring to move the poppet into sealing engagement with the valve seat sealing surface. This prevents any further fluid flow through the safety valve to thereby prevent the possibility of the escape of fluids or gases which may be either combustible or chemically harmful.

A better understanding of the invention will be obtained from the following detailed description taken in conjunction with the attached drawings.

DETAILED DESCRIPTION OF THE PREFERRED EMBODIMENTS

Figure 1:
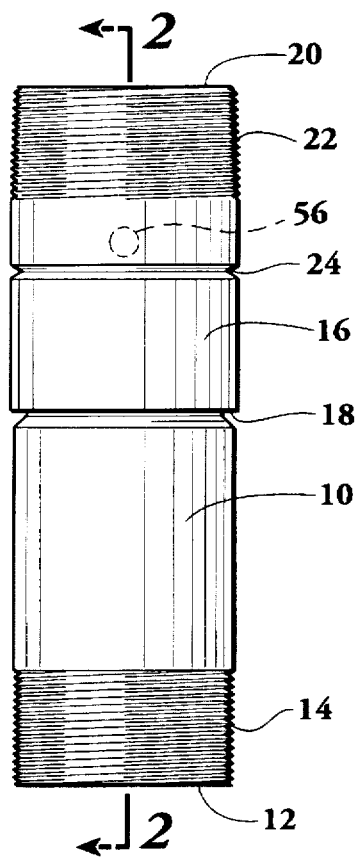
FIG. 1 is an external elevational view of a preferred embodiment of the safety shut off valve of this invention.

FIG. 1 illustrates a preferred embodiment of the invention, however, it is to be understood that in actual practice of the invention a safety shut off valve may have a completely different appearance while, nevertheless incorporating the principals of this invention. The invention may be formed of a single tubular body, however, the preferred arrangement employs a first and second tubular body. FIG. 1 illustrates first tubular body 10 having a first end 12. Threads 14 are formed on the body adjacent first end 12. Threadably secured to body 10 is a second tubular body 16 that has a first end 18 and second end 20, with threads 22 on the exterior of the second body adjacent second end 20. Formed on the exterior of second body 16 is a circumferential groove 24 forming an area of structural weakness or a break point for purposes to be described subsequentially.

Figure 4:
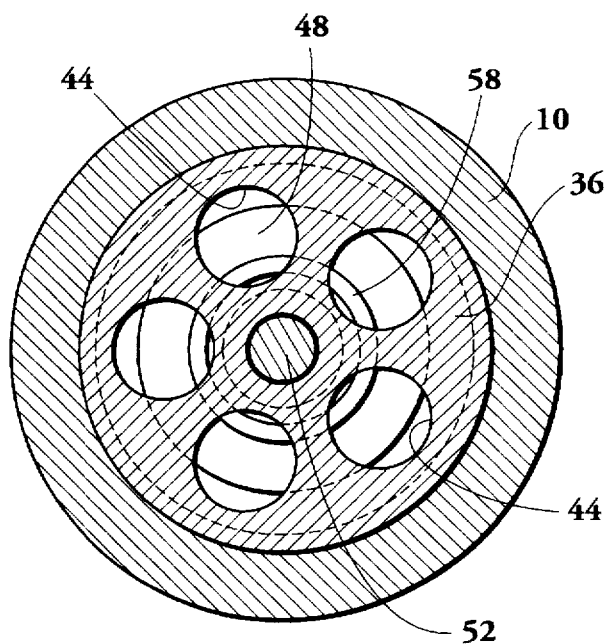
FIG. 4 is a cross-sectional view taken along the line 4—4 of FIG. 2 showing the valve guide supporting the poppet cylindrical shaft within the interior of the tubular first body.
Figure 5:
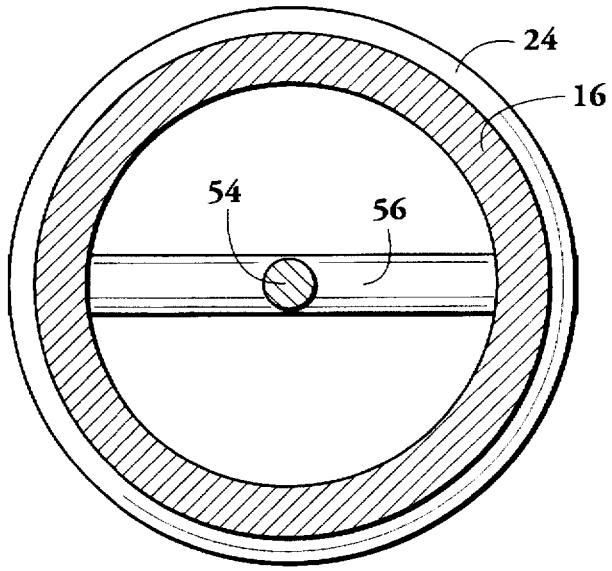
FIG. 5 is a cross-sectional view of the second body taken along the line 5—5 of FIG. 2. This cross-section is taken at the circumferential break point of reduced structural strength of the second body and shows the stop member mounted within the second body and the poppet plunger that engages the stop member to hold the poppet in open position.
Figure 2:
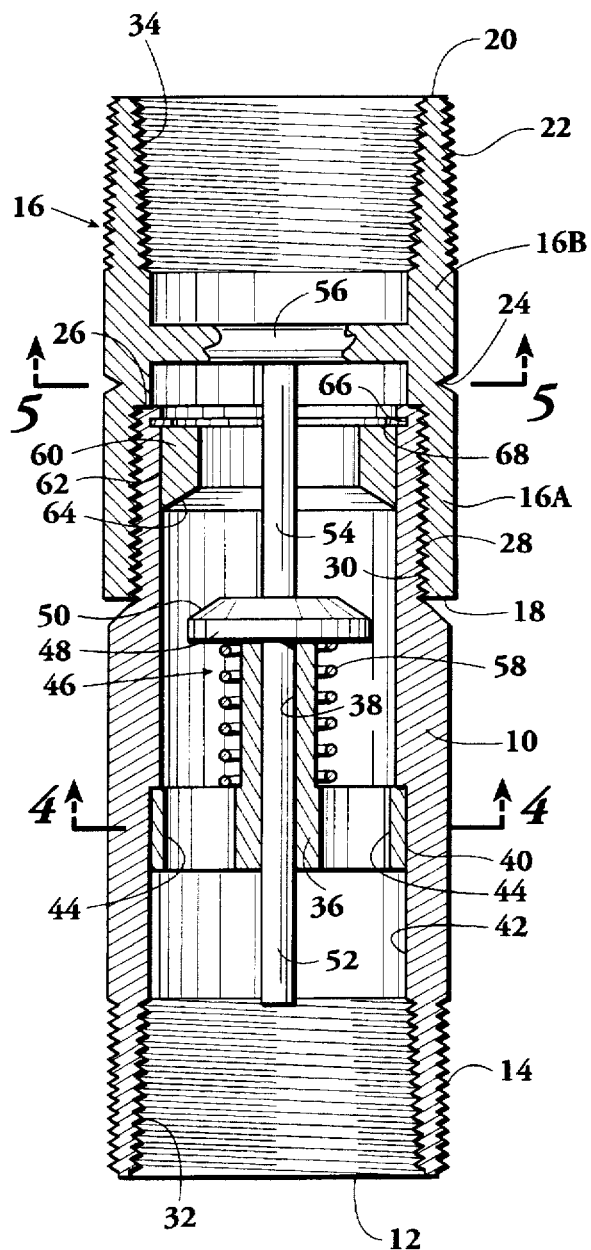
FIG. 2 is a cross-sectional view, of enlarged scale, of the safety shut off valve as taken along the line 2—2 of FIG. 1.

Referring now to FIGS. 2, 4 and 5, the interior arrangement of the safety shut off valve is shown. Tubular first body 10 has a second end 26 and external threads 28. Second body 16 has internal threads 30 at first end 18 so that first body 10 and second body 16 are threadably connected to each other in coaxial relationship. The external threads 14 on first body 10 provide means for attachment to some other piece of equipment, such as a pipeline, a liquid dispensing vessel or the like. Threads 22 at the second end of second body 16 provide means for attachment of a hose, pipe or other apparatus through which gas or liquid is to flow. First body 10, at first end 12, has internal threads 32 and, in like manner, second body 16 at second end 20 has internal threads 34. This is for convenience of the user only and illustrates that by including both internal and external threads at the ends of the assembled safety shut off valve it may be connected to an ancillary apparatus either by employing internal or external threads.

Positioned within tubular first body 10 is a valve guide 36 that has a cylindrical opening 38 that is coaxial with tubular first body 10. Valve guide 36 further has an exterior cylindrical surface 40 that fits the interior cylindrical surface 42 of tubular first body 10. In a preferred arrangement, valve guide 36 is press fitted into the first body interior surface 42.

Valve guide 36 further has spaced openings 44 through which fluid can pass, the fluid being either liquids or gases.

A poppet, generally indicated by the numeral 46, is slidably received within tubular first body 10. Poppet 46 has an enlarged diameter flange portion 48 having a circumferential sealing surface 50 thereon. A guide shaft 52 extends coaxially from the poppet flange portion 48 and is slidably received within cylindrical opening 38 of valve guide 36. Plunger 54 extends coaxially from poppet flange portion 48 in the direction opposite of shaft 52, the plunger functioning to retain the poppet in an open position.

Formed integrally with second tubular body 16 is a stop member 56 which is shown as being circular in cross-section but which can be rectangular. Instead of being formed integrally with second tubular body 16, stop member 56 can be formed as a pin inserted in drilled openings in the second tubular body. Stop member 56 is positioned to extend through the tubular axis of second tubular body 16 and is thereby engaged by plunger 54 as shown in FIG. 2.

Received about a portion of valve guide 36 is a compression spring 58 that engages the valve guide at one end and poppet flange portion 48 at the other. Spring 58 urges the poppet towards a closed position but the poppet is held against the compression spring 58 by engagement of the outer end of plunger 54 with stop member 56.

Removably received within the interior of tubular first body 10, adjacent the second end 26 thereof, is a tubular valve seat 60. Seat 60 has an external cylindrical surface 62 that closely fits the internal cylindrical surface of first tubular body 10 and has also a circumferential sealing surface 64. The sealing surface 50 on poppet 46 is configured to mate with sealing surface 64 of valve seat 60 so that when the poppet is closed against the valve seat, fluid flow through first body 10 is prevented.

A circumferential groove 66 is formed in the interior cylindrical surface of first body 10 adjacent end 26. Positioned within groove 66 is a circumferential retainer 68 against which valve seat 60 abuts. Valve seat 60 is preferably press fitted into the interior of first body 10. With retainer 68 positioned within groove 66, valve seat 60 is prevented from being displaced out of the first body second end 26.

As seen in FIG. 2, as long as the safety shut off valve is intact, flange portion 48 of poppet 46 is held away from valve seat 64 and fluid can flow freely through the valve. If undue stress is placed on the valve, second body 16 will be severed about break point 24. That is, the safety break point 24 formed in the exterior of second tubular body 16 is dimensioned to form the weakest point in the conduit assembly of which the safety shut off valve is a part so that if any undue stress is placed on the assembly, such as to piping or flexible hose or the like, rather than rupturing the piping or a hose or any other portion of an assembly for delivering liquids or gases, the rupture or breakage will take place at safety break point 24. When this happens, the second body break away portion 16B is severed from second body base portion 16A, which remains attached to first body portion 10, so that the safety shut off valve appears as in FIG. 3. When the second body portion 16B is removed by breakage at break point 24, stop member 56 is removed so that it no longer impinges against plunger 54 and spring 58 urges poppet 46 in the forward direction so that flange portion 48 engages valve seat 60. More specifically, sealing surface 50 of flange portion 48 engages sealing surface 64 of valve seat 60 thereby closing the flow of liquid or gas through the valve. This prevents inadvertent discharge into the environment of liquids or gases.

Figure 3:
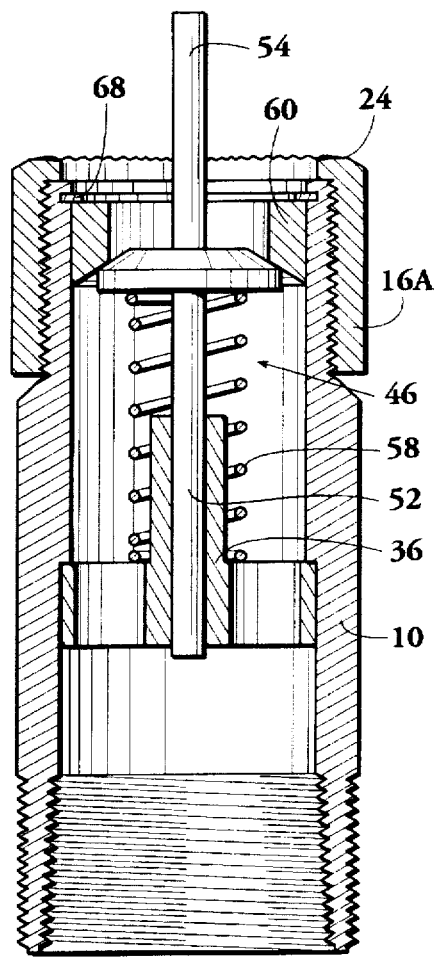
FIG. 3 is a cross-sectional view of the safety shut off valve as shown in FIG. 2 but with a portion of the valve tubular second body broken away and showing the valve poppet in closed position to thereby prevent further flow of liquids or gases through the valve first body.

When a breakage occurs as illustrated in FIG. 3, the safety shut off valve can be restored by replacing second tubular body base portion 16A with a new complete second body 16 as illustrated in FIGS. 1 and 2. That is, the entire safety shut off valve is not destroyed but only the most inexpensive portion thereof so that the safety shut off valve can be repeatably reused by threadably replacing second tubular body 16. Further, if the poppet valve seat 50 or the valve seat sealing surface 64 become pitted or worn so that they would leak when closed, the entire poppet 46 can be easily replaced and, by removing retainer 68, a new valve seat 60 can be installed.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A safety shut off valve comprising:

a tubular body having first and second ends and a circumferential breaking point spaced from the second end, the body having an internal circumferential groove therein spaced between said body first end and said breaking point;

an axial guide positioned within said body;

a poppet having a cylindrical shaft and a concentric enlarged external diameter flange portion having a circumferential seating surface thereon, the cylindrical shaft being slidably supported by said guide, the poppet being moveable between a valve open and a valve closed position, the poppet having a plunger portion extending from said flange portion in the direction opposite of and coaxially with said cylindrical shaft;

a tubular seat slidably positioned within said tubular body and having a circumferential seating surface contacted by said poppet seating surface when said poppet is in said closed position;

a stop member mounted within said body against which said plunger seats and by which said poppet is held in said poppet open position, the stop member being positioned between said circumferential breaking point and said body second end;

spring means urging said poppet towards said valve closed position, said poppet moving to said poppet closed position when said body is severed at said break point to close said body against fluid flow therethrough; and a removable expandable ring received within said groove in said tubular body against which said tubular seat is positioned and by which said seat is held within said tubular body against force applied by said poppet when in said valve closed position.

2. A safety shut off valve according to claim 1 wherein said tubular body is formed in two parts comprising a tubular first body having first and second ends and a tubular second body having first and second ends, the second body first end being removably attached to said first body second end whereby the first and second tubular bodies are held in co-axial relationship, said circumferential breaking point being formed on said second body and said stop member being mounted within said second body between said circumferential break point and said second body second end.

3. A safety shut off valve according to claim 1 wherein said stop member is integrally formed within said body.

4. A safety shut off valve according to claim 1 wherein said guide has a circumferential portion engaging an internal circumferential surface within said body and an elongated integral tubular control portion that slidably receives said poppet cylindrical shaft.

5. A safety shut off valve according to claim 1 wherein said guide is removably pressed fitted within said body.

6. A safety shut off valve according to claim 2 wherein said first body has threads at said second end and said second body has mating threads at said first end thereof whereby said second body is removably threadably attached to said first body.

7. A safety shut off valve according to claim 2 wherein said first body is formed of an elongated tubular member having a first internal diameter communicating with said first body first end and a second internal diameter communicating with said first body second end providing an internal ledge against which said axial guide is positioned.

8. A safety shut off valve according to claim 2 wherein said tubular first body and said tubular second body are each of substantially the same external diameters.

\* \* \* \* \*